United States Patent [19]
Takeuchi et al.

[11] Patent Number: 4,529,649
[45] Date of Patent: Jul. 16, 1985

[54] MAGNETIC RECORDING MEDIUM

[75] Inventors: Takashi Takeuchi; Shoji Kobayashi, both of Utsunomiya; Tsuyoshi Ohtani, Ichikaimachi; Tetusya Imamura, Utsunomiya, all of Japan

[73] Assignee: Kao Corporation, Tokyo, Japan

[21] Appl. No.: 543,185

[22] Filed: Oct. 18, 1983

[30] Foreign Application Priority Data

Oct. 27, 1982 [JP] Japan ................................ 57-188779

[51] Int. Cl.³ ............................................. B32B 15/08
[52] U.S. Cl. ..................................... 428/328; 428/329; 428/403; 428/405; 428/407; 428/447; 428/692; 428/694; 428/900
[58] Field of Search ............... 428/692, 693, 694, 695, 428/403, 405, 447; 426/900, 220, 328, 329, 407

[56] References Cited

U.S. PATENT DOCUMENTS 4,268,599 5/1981 Russell, Jr. ........................... 428/407
4,336,310 6/1982 Okuyama et al. ................... 428/695

FOREIGN PATENT DOCUMENTS 155703 9/1983 Japan .

Primary Examiner—George F. Lesmes
Assistant Examiner—William M. Atkinson
Attorney, Agent, or Firm—Flynn, Thiel, Boutell & Tanis

[57] ABSTRACT

A magnetic recording medium excellent in magnetic properties and durability is provided which is characterized by containing magnetic powder coated with a reaction product between an aminosilane coupling agent and at least one compound selected from the group consisting of an acid anhydride of 6 to 22 carbon atoms and an alkylketene dimer. A magnetic paint containing said coated magnetic powder has good dispersibility of the magnetic powder and provides improved adhesion between the magnetic powder and a binder.

4 Claims, No Drawings

MAGNETIC RECORDING MEDIUM

BACKGROUND OF THE INVENTION

This invention relates to an improved magnetic recording medium. More particularly, this invention relates to a magnetic recording medium excellent in magnetic properties and durability, which medium is produced from a magnetic paint improved in the dispersibility of magnetic powders and in the adhesion between the magnetic powders and a binder.

The magnetic powders in a magnetic recording medium, such as magnetic tape or magnetic disc, must have good dispersibility.

A magnetic recording medium is generally produced by uniformly coating a substrate, such as plastic film or sheet, with a magnetic paint prepared by mixing magnetic powders with a binder, various additives and a solvent, drying the painted film and specular surface finish treating the magnetic layer. However, a uniform smooth magnetic layer having a high packing density cannot be obtained, unless agglomerated particles are previously removed by fully dispersing and peptizing the magnetic powders in the magnetic paint.

Nonuniformity in a magnetic layer due to agglomerated particles of magnetic powders exerts a serious adverse effect on the electromagnetic transduction characteristics and magnetic properties of magnetic tape. That is, it causes a lowered output, increased noise, dropout, etc. Further, when the adhesion between magnetic powders and binder is not sufficient, peeling of the magnetic powders from the magnetic film layer is apt to occur while the magnetic recording medium is sliding on a recording head or a reproducing head, and is apt to roughen, with a consequent decrease in the durability of the magnetic recording medium. In the case of conventional magnetic recording media, it has been customary that they are put into practical use without having sufficient durability.

The dispersibility of magnetic powder in a magnetic paint and the adhesion between the magnetic powder and a binder are very important in improving the performance of a magnetic recording medium.

Concerning improvement in the dispersibility of magnetic powder, studies have been made from various viewpoints, and it is proposed to improve the dispersibility by adding a suitable surfactant to a magnetic paint formulation. As such a surfactant, an amine compound and its derivative, a phosphate ester, a polyoxyethylene phosphate or the like is used in most cases, as shown in, for example, a process in which an alkylimidazoline compound is used (Japanese Patent Laid-Open No. 32304/1979), a process in which an alkylpolyoxyethylene phosphate is used after neutralization with an alkylamine (Japanese Patent Laid-Open No. 78810/1978), and a process in which a long-chain alkyl phosphate is used (Japanese Patent Laid-Open No. 147507/1979, Japanese Patent Application No. 49629/1978). Moreover, there are proposals that an improved dispersibility can be obtained by preparing a magnetic paint after treating the surface of magnetic powders, as exemplified by a process in which an alkylpolyoxyethylene phosphate is used (Japanese Patent Laid-Open Nos. 94308/1979 and 49769/1981), and a process in which a titanium coupling agent is used as a surface treating agent for metal powders to attain dispersion stability of a magnetic paint and to prevent the deterioration of magnetic film layer. (Japanese Patent Laid-Open No. 88471/1981). On the other hand, processes in which improvement in durability of magnetic film is attained by improving adhesion between magnetic powders and a binder, include a process in which a silane coupling agent having functional groups reactive with a binder is used (Japanese Patent Laid-Open No. 7310/1979), a process in which magnetic powders are coated with a reaction product of an aminofunctional silane coupling agent and isocyanate compound or an epoxy compound (Japanese Patent Laid-Open No. 143533/1981), a process in which magnetic powder is coated with a titanium coupling agent having an unsaturated bond radicalpolymerizable with a double bond of a binder (Japanese Patent Laid-Open No. 111129/1981), and a process in which a compound having at least four radiation-sensitive acrylic double bonds in the molecule is used as a binder (Japanese Patent Laid-Open No. 40744/1982). In spite of a number of these studies concerning improvement in dispersibility of magnetic powders in a magnetic paint and in durability of magnetic paint film, a satisfactory stage of improvement has not yet been reached.

As a result of an ardent study made under these circumstances to obtain a magnetic recording medium excellent in dispersibility of magnetic powder and durability of a paint layer, the inventors of this invention have found that a magnetic recording medium containing magnetic powders coated with a reaction product between an amino group-containing silane coupling agent and a certain specified compound can have excellent dispersibility of the magnetic powders and excellent durability of painted film and have accomplished this invention.

DETAILED DESCRIPTION OF THE INVENTION

This invention provides a magnetic recording medium containing magnetic powders coated with a reaction product between an amino group-containing silane coupling agent and at least one compound selected from the group consisting of an acid anhydride of 6 to 22 carbon atoms (I) and an alkylketene dimer (II).

As the amino group-containing silane coupling agents according to this invention, mention can be made of, for example, compounds such as $H_2NC_2H_4NHC_3H_6Si(OCH_3)_3$, $H_2NC_2H_4NHC_3H_6Si(CH_3)(OCH_3)_2$, $H_2NC_3H_6Si(OC_2H_5)_3$, $H_2NCONHC_3H_6Si(OC_2H_5)_3$ and

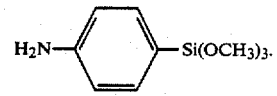

The acid anhydride to be used in the invention has 6 to 22 carbon atoms and preferably includes alkenyl succinic anhydrides such as octenyl succinic anhydride, decenyl succinic anhydride, dodecenyl succinic anhydride, tetradecenyl succinic anhydride and octadecenyl succinic anhydride, alkyl succinic anhydrides as obtained by hydrogenating respective alkenyl succinic anhydrides before mentioned, propionic anhydride, benzoic anhydride and phthalic anhydride. The alkyl ketene dimer to be used in the invention has 12 to 44 carbon atoms and preferably includes hexyl ketene dimer, octyl ketene dimer, decyl ketene dimer, dodecyl ketene dimer, tetradecyl ketene dimer, hexadecyl ketene dimer and octadecyl (stearyl) ketene dimer.

As the magnetic powders relating to this invention, mention can be made of, for example, metal oxides such as acicular fine $\gamma$-$Fe_2O_3$, $Fe_3O_4$ and $CrO_2$, and treated $\gamma$-$Fe_2O_3$ such as Co-coated $\gamma$-$Fe_2O_3$ and Co-doped $\gamma$-$Fe_2O_3$, iron metal powders, microplateform barium ferrite, magnetic powder derived by replacing part of its Fe atoms with at least one metal selected from the group consisting of Ti, Co, Zn, V and Nb, and submicro-scopic metal or alloy powders of Co, Fe-Co, Fe-Ni or the like. Among these, iron metal powder has particularly poor chemical stability, so that it is sometimes surface-treated or mixed with a small amount of nickel, cobalt, titanium, silicon, aluminum, etc., in the form of a metal atom, salt or oxide for the purpose of improving its chemical stability, and such an iron powder may also be used. The iron metal powder is sometimes given a thin oxide film on its surface by treating it in a weakly oxidizing atmosphere for the purpose of its stabilization, and the metal powders thus treated can also be used.

These magnetic powders preferably have a long axis of 1 to $0.15\mu$ and a short axis of 0.15 to $0.15\mu$. A magnetic powder having a long axis larger than $1\mu$ is not desirable because it causes a disadvantage in short-wavelength recording or increased noise though it is easily dispersible. A magnetic powder with a long axis smaller than $0.15\mu$ is far from being satisfactory with respect to dispersibility.

In this invention, there is no particular limitation as to a method for obtaining magnetic powder coated with a reaction product between an amino group-containing silane coupling agent and a compound selected from the above-mentioned compounds (I) and (II). For example, the following processes are shown:

(1) a process comprising treating magnetic powders (i) together with an amino group-containing silane coupling agent (ii) by heating in an inert organic solvent, and then treating the magnetic powder together with at least one compound (iii) selected from the group consisting of the above-mentioned compounds (I) and (II).

(2) a process comprising mixing the above compounds (i), (ii) and (iii) at once and then treating the mixture by heating.

(3) a process comprising reacting the above compounds (ii) and (iii) together in an inert organic solvent, adding compound (i) to the reaction mixture and treating the resulting mixture by heating.

The magnetic recording medium of this invention can be obtained by formulating a paint by adding a binder and a solvent to a magnetic powder treated according to the above process and applying the paint to a polyester film or the like. The pertinent procedures including the treatment process for the magnetic powder will be described later in more detail in examples.

The amount of the amino group-containing silane coupling agent relating to this invention is about 0.05 to 3 wt.% preferably 0.2 to 1.5 wt.%, based on magnetic powder. Further, the amount of one compound selected from the groups consisting of the above-mentioned compounds (I) and (II) is preferably nearly equimolar to that of the amino groups. This is because, when the amount is set in this way, it becomes possible to reduce the amount of unreacted compounds to the utmost. Furthermore, it is preferred, of course, that reaction conditions such as reaction temperature and reaction time are set so as to obtain the highest conversion.

As the inert solvents which can be used in the treatment of magnetic powder, mention can be made of, for example, methyl ethyl ketone, methyl isobutyl ketone, diethyl ketone, cyclohexanone, benzene, xylene and toluene.

The binders which are used in preparing a magnetic paint should be soluble in an organic solvent, and are those which perform well in the smallest possible amount in forming a magnetic layer by binding the above magnetic powders to a substrate and the magnetic powder particles to each other at a necessary strength. Further, even conventional binders which have a risk of lowering the dispersibility of magnetic powder in a paint may also be used by usual paint formulation method. Examples of the resin binders include polyurethane, polyester, polyvinyl chloride, vinyl chloride/vinyl acetate copolymers, polyacrylonitrile, nitrile rubber, epoxy resin, alkyd resin, polyamide, polyacrylate, polymethacrylate, polyvinyl acetate, polyvinyl butyral, vinylidene chloride, vinylidene chloride copolymers, nitrocellulose and ethylcellulose, and these polymers can be used alone, but usually they are used as a combination of at least two of them. It is also possible to add a plasticizer or a hardener in order to adjust the resin hardness.

The amount of the binder added is usually 15 to 60 parts by weight per 100 parts by weight of magnetic powder. Even with a binder having the largest bonding force, the strength of magnetic paint film is low and the bonding strength between a substrate and the magnetic paint film becomes insufficient if the amount of the binder is below 15 parts by weight. When the amount is above 60 parts by weight, however, the concentration of magnetic powder in the magnetic paint film becomes low, causing a disadvantageous decrease in the reproduction output and lowering in the paint film properties as well.

The solvents which are used in paint formulation are preferably those which can dissolve a binder and have a boiling point between 50° and 150° C. When the boiling point is too low, the paint is dried before the magnetic orientation is performed. The solvent is selected from the above viewpoint according to the kind of the binder, but of course it should be selected in consideration of a problem of toxicity or environmental pollution.

This invention will now be described in more detail with reference to examples, but it should be noted that this invention is not limited to these examples.

EXAMPLE 1

150 g of Co-coated $\gamma$-$Fe_2O_3$ with a long axis of 0.35 $\mu$m and an axis ratio of 1/10, 300 g of methyl ethyl ketone and 1.5 of $\gamma$-aminopropyltriethoxysilane (A-1000, a product of Nippon Unicar Co.) were placed in a 4-necked flask equipped with a condenser and agitated at 90° C. for 1 hour, and then the magnetic powders were washed with a large quantity of methyl ethyl ketone. Then, 120 g of the magnetic powders, 300 g of methyl ethyl ketone and 2 g of dodecenylsuccinic anhydride were placed in a 4-necked flask and agitated at 80° to 90° C. for 1 hour to obtain a treated magnetic powders. The obtained powders were washed with a large quantity of methyl ethyl ketone. A magnetic paint was obtained by mixing these powders with 30 g of binder resin which is compound of a vinyl chloride/vinyl acetate copolymer (VAGH, a product of Union Carbide Co., U.S.A.) and a polyurethane resin (Nippolan 2304, a product of Nippon Polyurethane Industries, Co., Ltd.) (1:1, weight ratio) and 130 g of a mixture (1:1, weight ratio) of methyl ethyl ketone and cyclohexanone as a solvent, and milling the mixture in a ball mill for 24 hours.

Next, this magnetic paint was applied to the surface of a polyester film by means of a 30 μm applicator and, after magnetic orientation, dried with hot air. Then, the paint film was smoothed by calendaring to obtain a magnetic recording medium. The obtained recording medium was measured for a squareness ratio which is a measure for evaluating the dispersibility of the magnetic powder and further measured for an abrasion loss for evaluating the durability of the magnetic recording medium. The results are shown in Table 1. The measurement of the abrasion loss was carried out by rubbing the magnetic recording medium, 3 cm wide and 50 cm long, with an Emery paper CC-1000, for 30 minutes under a constant load.

EXAMPLE 2

A treated magnetic powder, a magnetic paint and a magnetic recording medium were obtained by the same procedures as in Example 1 except that 2 g of octadecenylsuccinic anhydride was used instead of dodecenylsuccinic anhydride used in Example 1. The magnetic recording medium was measured for a squareness ratio and an abrasion loss. The results are shown in Table 1.

EXAMPLE 3

A treated magnetic powder, a magnetic paint and a magnetic recording medium were obtained by the same procedures as in Example 1 except that 2 g of stearylketene dimer was used instead of dodecenylsuccinic anhydride used in Example 1. This magnetic recording medium was measured for a squareness ratio and an abrasion loss. The results are shown in Table 1.

EXAMPLE 4

150 g Co-coated γ-Fe$_2$O$_3$ with a long axis of 0.33μ and an axis ratio ⅛, 300 g of toluene, 1.5 g of γ-aminopropyltriethoxysilane and 2.4 g of octadecenylsuccinic anhydride were placed in a 4-necked flask equipped with a condenser and agitated at 85° to 90° C. for 3 hours to obtain a treated magnetic powder. The obtained powder was washed with a large quantity of toluene, and then the same procedures as in Example 1 were followed to obtain a magnetic recording medium, which was then measured for a squareness ratio and an abrasion loss. The results are shown in Table 1.

EXAMPLE 5

300 g of toluene, 1.5 g of γ-aminopropyltriethoxysilane and 2.4 g of octadecenylsuccinic anhydride were placed in a 4-necked flask equipped with a condenser and agitated at 80° to 85° C. for 1 hour. After cooling the reaction system to room temperature, 150 g of Co-coated γ-Fe$_2$O$_3$ powder used in Example 1 was added, and the mixture was again agitated at 85° to 90° C. for 3 hours to obtain a treated magnetic powder. The obtained powder was washed with a large quantity of toluene, and then the same procedures as in Example 1 were followed to obtain a magnetic recording medium, which was then measured for a squareness ratio and an abrasion loss. The results are shown in Table 1.

COMPARATIVE EXAMPLE 1

To a Co-coated γ-Fe$_2$O$_3$ powder as used in Example 1 which had not undergone any surface treatment was added 3 wt.%, based on the magnetic powder, of soybean oil lecithin as a dispersant. Then, the same procedures as in Example 1 were followed to obtain a magnetic paint and a magnetic recording medium, which was then measured for a squareness ratio and an abrasion loss. The results are shown in Table 1.

COMPARATIVE EXAMPLE 2

The same procedures as in Example 1 except that 3 wt.%, based on the magnetic powder, of octyl phosphate was used instead of soybean oil lecithin used in Comparative Example 1 were followed to obtain a magnetic paint, and a magnetic recording medium, which was then measured for a squareness ratio and an abrasion loss. The results are shown in Table 1.

TABLE 1

| Magnetic recording media | Paint film properties | |
|---|---|---|
| | Squareness ratio | Abrasion loss (mg) |
| Example 1 | 0.85 | 15 |
| Example 2 | 0.83 | 21 |
| Example 3 | 0.84 | 11 |
| Example 4 | 0.85 | 15 |
| Example 5 | 0.84 | 12 |
| Comparative Example 1 | 0.82 | 68 |
| Comparative Example 2 | 0.84 | 107 |

Table 1 clearly shows that the magnetic recording media of this invention have a large squareness ratio and a small abrasion loss. This is evidence to the effect that the magnetic recording media of this invention have good dispersibility of magnetic powders and good durability as well.

The embodiments of the invention in which an exclusive property or privilege is claimed are defined as follows:

1. A magnetic recording medium which comprises a magnetic material powder having coated thereon a reaction product of an amino group-containing silane coupling agent and at least one compound selected from the group consisting of acid anhydrides having 6 to 22 carbon atoms and alkyl ketene dimers having 12 to 44 carbon atoms, the particles of said magnetic material powder having a long axis of from 0.15 to 1.0μ and a short axis of from 0.015 to 0.15μ.

2. A magnetic recording member which comprises a substrate coated with a film containing a magnetic recording powder as claimed in claim 1, said film also containing from 15 to 60 parts by weight of a binder, per 100 parts by weight of said magnetic recording powder.

3. A magnetic recording powder which comprises a magnetic material powder and a coating thereon of a reaction product of an amino group-containing silane coupling agent and at least one compound selected from the group consisting of acid anhydrides having 6 to 22 carbon atoms and alkyl ketene dimers having 12 to 44 carbon atoms, the particles of said magnetic material powder having a long axis of from 0.15 to 1.0μ and a short axis of from 0.015 to 0.15μ.

4. A magnetic recording powder as claimed in claim 1, in which said acid anhydride is selected from the group consisting of octenyl succinic anhydride, decenyl succinic anhydride, dodecenyl succinic anhydride, tetradecenyl succinic anhydride, octadecenyl succinic anhydride, alkyl succinic anhydrides as obtained by hydrogenating the above-mentioned alkenyl succinic anhydrides, propionic anhydride, benzoic anhydride and phthalic anhydride; said alkyl ketene dimer is selected from the group consisting of hexyl ketene dimer, octyl ketene dimer, decyl ketene dimer, dodecyl ketene dimer, tetradecyl ketene dimer, hexadecyl ketene dimer and octadecyl ketene dimer; and said amino group-containing silane coupling agent is selected from the group consisting of $H_2NC_2H_4NHC_3H_6Si(OCH_3)_3$, $H_2NC_2H_4NHC_3H_6Si(CH_3)(OCH_3)_2$, $H_2NC_3H_6Si(OC_2H_5)_3$, $H_2NCONHC_3H_6Si(OC_2H_5)_3$ and

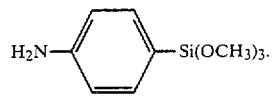

* * * * *